United States Patent [19]

McCauley et al.

[11] Patent Number: 4,686,874

[45] Date of Patent: Aug. 18, 1987

[54] TAMPER-PROOF BOLT AND TAMPER-PROOF BOLT-KEY COMBINATION

[75] Inventors: Durham S. McCauley, Boston; Miller G. McCalmon, Orchard Park, both of N.Y.

[73] Assignee: McGard, Inc., Buffalo, N.Y.

[21] Appl. No.: 812,232

[22] Filed: Dec. 23, 1985

[51] Int. Cl.$^4$ .................. B25B 13/48; B25B 15/02; F16B 23/00; F16B 35/06
[52] U.S. Cl. ..................... 81/461; 81/436; 292/251; 411/403; 411/410
[58] Field of Search .............. 411/402, 403, 407, 410, 411/408, 910, 423, 424; 292/251; 81/436, 121.1, 461

[56] References Cited

U.S. PATENT DOCUMENTS

| Re. 22,681 | 10/1945 | Bugg | 411/403 |
|---|---|---|---|
| 755,804 | 3/1904 | Smith | 411/402 |
| 2,049,105 | 7/1936 | Clarke | 411/402 |
| 2,248,695 | 7/1941 | Bradshaw | 411/410 |
| 3,241,408 | 3/1966 | McCauley | 81/71 |
| 3,369,441 | 2/1968 | Kosar | 85/45 |
| 3,584,667 | 6/1971 | Reiland | 411/402 |
| 3,854,372 | 12/1974 | Gutshall | 411/402 |
| 4,211,128 | 7/1980 | Plumer | 411/403 |
| 4,267,870 | 5/1981 | Warner | 411/410 |
| 4,269,246 | 5/1981 | Larson et al. | 411/403 |
| 4,314,885 | 2/1982 | Edwards et al. | 411/403 |
| 4,452,556 | 6/1984 | Nelson et al. | 411/403 |
| 4,459,074 | 7/1984 | Capuano | 411/403 |
| 4,480,513 | 11/1984 | McCauley et al. | 81/436 |

FOREIGN PATENT DOCUMENTS

| 110624 | 4/1964 | Czechoslovakia | 411/402 |
|---|---|---|---|
| 173307 | 2/1935 | Switzerland | 411/402 |
| 1115193 | 5/1968 | United Kingdom | 411/402 |
| 1463496 | 2/1977 | United Kingdom | 411/408 |

Primary Examiner—William F. Pate, III
Assistant Examiner—Michael Safavi
Attorney, Agent, or Firm—Joseph P. Gastel

[57] ABSTRACT

A tamper-proof bolt including a shank with a threaded end portion merging into an unthreaded portion of lesser diameter merging into an enlarged unthreaded portion merging into the larger base of a frustoconical head also having a smaller base, an undulating curvilinear groove in the smaller base, an island having lobes within the groove, an outer side in the groove, an inner side in the groove formed by the sides of the lobes of the island, and a cylindrical boss on the island extending axially outwardly from the smaller base and having a radial dimension which is approximately equal to the minimum radial dimension of the undulating groove. A key having an undulating curvilinear ridge for reception in complementary mating engagement in the curvilinear undulating groove of the bolt and having portions of a minimum radial dimension of approximately the same size as the boss for rotating engagement relative thereto and having lobes for meshing engagement with the sides of the undulating curvilinar groove when it is received therein.

7 Claims, 11 Drawing Figures

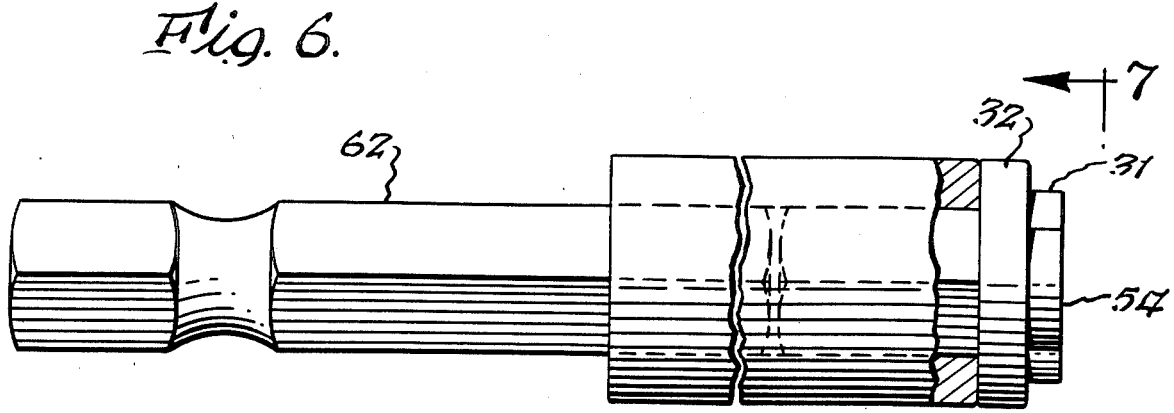
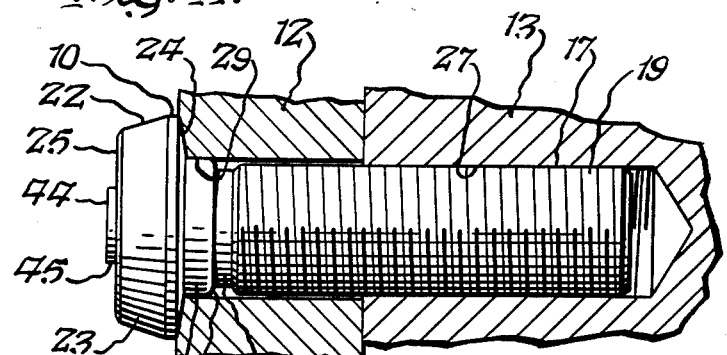
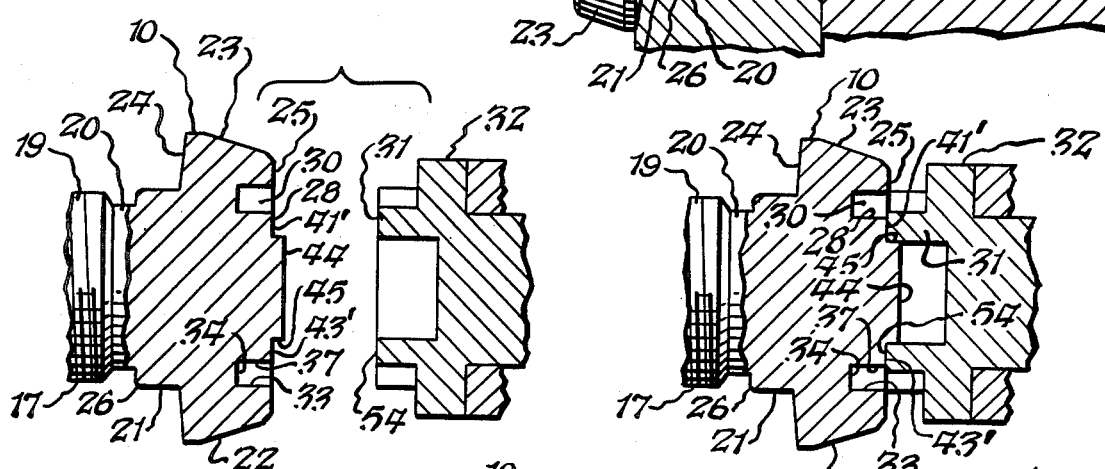
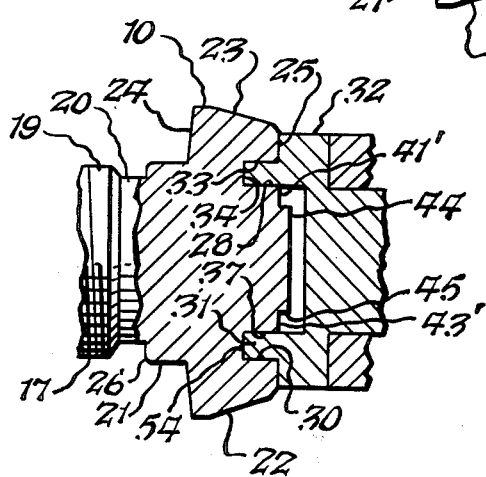

TAMPER-PROOF BOLT AND TAMPER-PROOF BOLT-KEY COMBINATION

BACKGROUND OF THE INVENTION

The present invention relates to a tamper-proof bolt construction which can only be removed from its fully installed position by the use of a proper key and which can be installed by the use of a self-aligning power-driven key.

By way of background, pilferage of home heating gas by meter tampering has reached monumental proportions. This tampering is effected in a number of ways which include (1) removing the face plate of the meter and resetting the dials which show the amount of gas used and (2) removing the top plate or an access plate of the meter and adjusting or reworking the inner mechanism of the meter. The foregoing disassembling of the meter for modification purposes can be easily effected because the various parts are fastened to each other by conventional screws or bolts which can be removed by conventional tools, such as wrenches or screw drivers.

SUMMARY OF THE INVENTION

It is accordingly one object of the present invention to provide a tamper-proof bolt which has a curvilinear undulating groove therein which can only be removed from its installed position by the use of a special key having a mating ridge.

Another object of the present invention is to provide tamper-proof bolt having a shank construction proximate the bolt head which will provide an interference fit with an associated part when the bolt is fully installed so that the bolt cannot be made to move sideways relative to its associated part and thus worked loose.

Yet another object of the present invention is to provide a tamper-proof bolt and key combination which include alignment structure for guiding an undulating curvilinear ridge on the key into complementary mating engagement with an undulating curvilinear groove in the bolt.

A further object of the present invention is to provide a tamper-proof bolt and key combination which permits the bolt to be installed by a power-driven key during assembly operations. Other objects and attendant advantages of the present invention will readily be perceived hereafter.

The present invention relates to a tamper-proof bolt comprising a shank having first and second ends, a threaded portion on said shank proximate said first end and extending toward said second end, a head formed integrally with said shank and located at said second end, an enlarged unthreaded portion on said shank proximate said head having a diameter which is larger than the diameter of said threaded portion, said head being of frustoconical outer configuration having a larger base and a smaller base with said larger base being located proximate said enlarged unthreaded portion and said smaller base being on the opposite side of said larger base from said enlarged unthreaded portion, and an undulating curvilinear groove in said smaller base for receiving a key.

The present invention also relates to a tamper-proof bolt comprising a shank, a threaded end on said shank, a frustoconical head on said shank, a face on said head, an undulating curvilinear groove in said face, an island within said groove, a plurality of lobes defining the outer side of said island and comprising the inner side of said groove, an outer side on said groove defining the outer side thereof, and a cylindrical boss coaxial with said shank and extending axially outwardly from said island.

The present invention also relates to a self-aligning fastener and key construction comprising: a head on said fastener, a face on said head, an undulating curvilinear groove in said face, an island within said groove, an outer side in said groove facing said island, a plurality of lobes on said island defining the inner side of said undulating curvilinear groove, a boss of cylindrical configuration on said island extending axially outwardly of said lobes and having a first radial dimension, a side on said boss, and portions of said inner side and portions of said side on said boss being in axial alignment with each other; and a key having an undulating curvilinear ridge thereon of complementary mating shape to said undulating curvilinear groove, and an inner side on said ridge for engaging said lobes, said inner side of said ridge including spaced innermost portions of which lie on a circle having a second radial dimension which is only slightly larger than said first radial dimension so that said spaced innermost portions of said ridge center said key relative to said head and permit said key to rotate relative to said head by riding on said side of said boss until said undulating curvilinear ridge is aligned with said undulating curvilinear groove and moves axially into driving relationship therewith.

The present invention also relates to a construction wherein a plate is mounted on a base having a threaded bore of a first diameter, and wherein said plate has a plate bore therein aligned with said threaded bore with said plate bore having a second diameter which is larger than said first diameter, a tamper-proof bolt comprising a shank having first and second ends, a threaded portion on said shank proximate said first end and extending toward said second end and having a third diameter of a size to fit into said threaded bore, a head formed integrally with said shank and located at said second end, an enlarged unthreaded portion on said shank proximate said head, said enlarged unthreaded portion having a fourth diameter which is slightly larger than said second diameter to provide an interference fit with said plate bore, said head being of frustoconical outer configuration having a larger base and a smaller base with said larger base being located proximate said enlarged unthreaded portion of said shank and said smaller base being on the opposite side of said larger base from said enlarged unthreaded portion of said shank, and an undulating curvilinear groove on said smaller base for receiving a key.

The various aspects of the present invention will be more fully understood when the following portions of the specification are read in conjunction with the accompanying drawings wherein:

BRIEF DESCRIPTION OF THE DRAWINGS

FIG. 6 is a fragmentary side elevational view of a tool for driving the bolt of the present invention;

FIG. 7 is a view of the head of the drive tool taken in the direction of 7—7 of FIG. 6;

FIG. 8 is a fragmentary cross sectional view of the head of the bolt and the drive tool in axial alignment but spaced apart prior to bringing them together.

FIG. 9 is a view similar to FIG. 8 but showing the key moved into engagement with the boss of the head centered within the innermost portions of the ridge of the key but with the ridge not yet being seated within the groove;

FIG. 10 is a view similar to FIG. 9 but showing the ridge on the key rotated to a position wherein it seats within the groove in the head; and FIG. 11 is a fragmentary cross sectional view taken substantially along line 11—11 of FIG. 1 and showing the relationship between the tamper-proof bolt, the face plate of the gas meter and the body of the meter.

DESCRIPTION OF THE PREFERRED EMBODIMENTS

Figure 1:
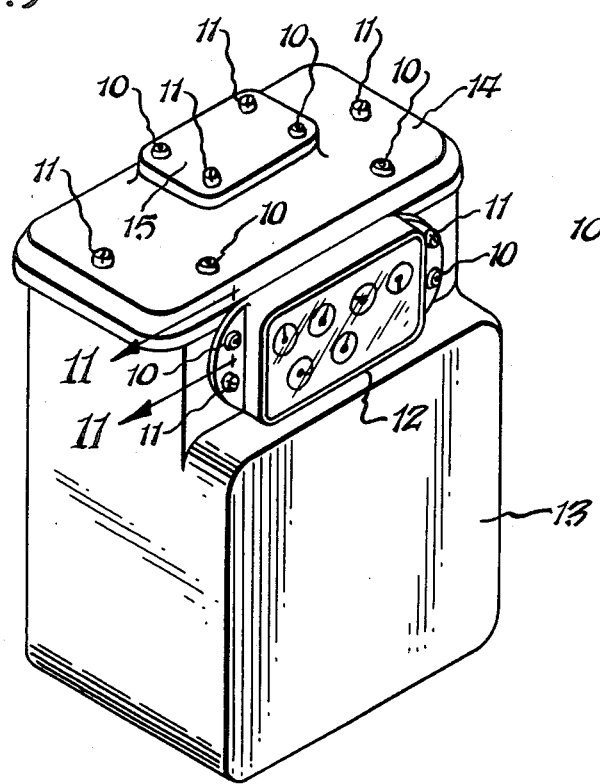
FIG. 1 is a perspective view of a gas meter onto which a plurality of the tamper-proof bolts of the present invention are mounted.
Figure 2:
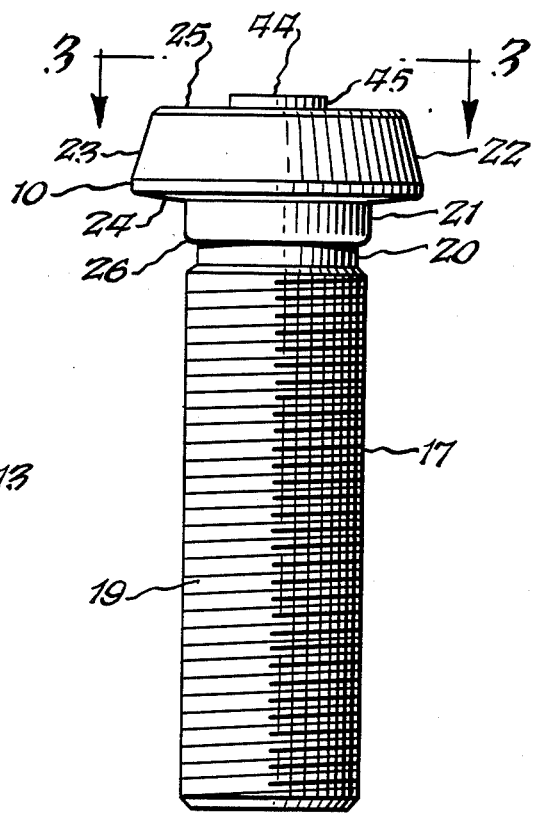
FIG. 2 is a side elevational view of the tamper-proof bolt of the present invention.

The tamper-proof bolt 10 of the present invention is intended to replace certain of the conventional bolts 11 which ordinarily are the only ones which attach the face plate 12 to the meter body 13 and which attach the top cover 14 to the meter body 13 and which attach the plate 15 to top cover 14. Conventional bolts 11 can be removed by a screwdriver. When the tamper-proof bolts 10 of the present invention are used in place of conventional bolts 11, the above-mentioned parts 12, 14 and 15 cannot be removed from the parts to which they are attached without the use of a special key.

Figure 4:
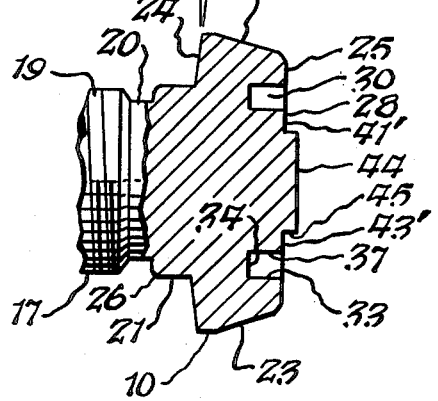
FIG. 4 is a fragmentary cross sectional view taken substantially along line 4—4 of FIG. 3 and showing the relative elevations of the groove, the outer edge of the island and the cylindrical boss on the island.

The tamper-proof bolt 10 includes a shank 17 having a threaded end 19 which merges into a smaller unthreaded portion 20 which merges into enlarged unthreaded portion 21 which merges into head 22 having a frustoconical outer configuration 23 with a larger base 24 and a smaller base or face 25. Larger base 24 is preferably inclined at 3° (FIG. 4) but may be planar. The bolt 10 is suitably hardened but the enlarged unthreaded portion 21 includes an inner portion which remains sufficiently ductile so that the head 22 cannot be snapped off by a sharp blow. In use, as shown in FIG. 11, the threaded portion 19 of bolt 10 is received in a suitably tapped bore 27 of meter body 13 and the enlarged unthreaded portion 21, which is of larger diameter than threaded portion 19, is received with an interference fit in bore 29 of face plate 12, with the base 24 of head 22 bearing on the latter. Face plate 12 is fabricated of aluminum or other material which is softer than enlarged bolt portion 21 so that the interference fit can be effected as the bolt is installed. The rounded shoulder 26 guides enlarged unthreaded portion 21 into plate bore 29. The 3° inclination of base 24 causes the bolt to bear into and slightly deform plate 12, to thereby provide good seating engagement therewith. The fact that enlarged portion 21 occupies bore 29 with an interference fit prevents bolt 10 from being worked sideways by side forces applied to frustoconical surface 23, which could result in loosening the bolt or fatiguing the bolt at the interface between base 13 and plate 12. The top plate 14 and plate 15 have bores therein which are analogous to bore 29.

Figure 3:
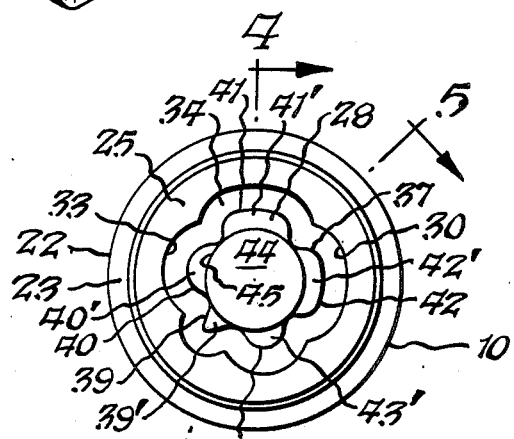
FIG. 3 is a view of the face of the bolt head taken in the direction of arrows 3—3 of FIG. 2.
Figure 5:
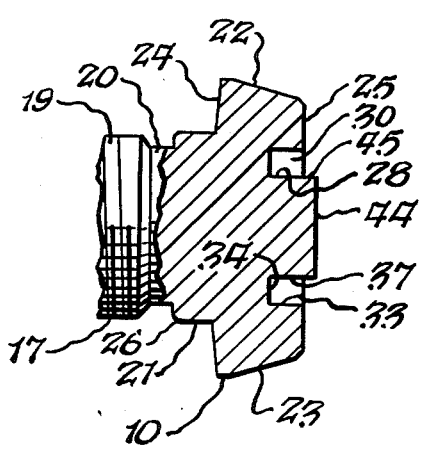
FIG. 5 is a fragmentary cross sectional view taken substantially along line 5—5 of FIG. 3 and showing the groove in the head and the axially aligned outer peripheries of the island and the boss at the innermost portions of the groove.

The smaller base or face 25 of head 22 has an undulating curvilinear groove 30 therein for receiving the ridge 31 of key 32 in complementary mating relationship, as will be described hereafter. Groove 30 includes an outer side wall 33 which extends between small base or face 25 and the bottom 34 of the groove. An island 28 is located within groove 30 and it includes a plurality of lobes 39, 40, 41, 42 and 43 which form an undulating curvilinear side wall 37 facing outer side wall 33. The tops of lobes 39, 40, 41, 42 and 43 are plateaus 39', 40', 41', 42' and 43', respectively, which all lie in the same plane, namely, the plane of face 25. A cylindrical boss 44 is coaxial with shank 17 and includes a side wall 45 which extends axially outwardly from the plateaus 39'-43'. The innermost portions of the island side wall 37 lie on a circle (not shown) which is of the same radial dimension as side wall 45 of boss 44. Thus, the innermost portions of side wall 37 and portions of boss side wall 45 are in axial alignment (FIGS. 3 and 5).

A drive key 32 is used to loosen or tighten bolt 10. Drive key 32 includes an undulating curvilinear ridge 31 which has inwardly extending lobes 47, 49, 50, 51 and 52, the innermost portions of which lie on an imaginary circle 53 which is of only slightly larger radial dimension or diameter than the radial dimension of cylindrical surface 45 of boss 44 so that when key 32 is axially aligned with the shank 17 of bolt 10 and the end surface 54 (FIG. 9) of ridge 31 seats on the plateaus 39'-43', cylindrical surface 45 will be received within ridge 31. Key 32 can be rotated while the end 54 of ridge 31 is seated on plateaus 39'-43' because the lobes 47, 49, 50, 51 and 52 of ridge 31 will be located axially outwardly of groove 30 (FIG. 9). When the ridge 31 of key 32 becomes aligned with complementary mating portions of groove 30, ridge 31 can be moved axially into toothed mating engagement with the sides of groove 30 (FIG. 10), and a driving relationship will be established between the lobes of the key and the lobes of the groove. Thus an air drive motor (not shown) can mount the shank 62 which mounts key 32 so that bolts 10 can be driven into final position by a rotating drive tool during assembly of the meter. Also when meters are refurbished periodically in the factory, the same type of power-driven tool can be used to remove bolts 10.

Once installed to a tightened condition, tamper-proof bolt 10 cannot be removed without the use of a proper key. In this respect, a wrench cannot grip frustoconical head surface 23, nor can any tool be wedged into groove 30 with sufficient force to apply a loosening torque to the bolt, especially since the sides of groove 30 and the side 45 of boss 44 have a very small axial dimension. A representative bolt 10 has the following approximate dimensions in inches: Height of boss 44—0.017; length of thread 19—0.600; length of unthreaded enlarged portion 21—0.063; diameter of large base 24 of head—0.473; diameter of small base 25 of head—0.390; depth of groove 30—0.032; depth of head 22—0.130; outer diameter of thread 0.184; outer diameter of unthreaded portion 20 at end of thread—0.157; outer diameter of enlarged unthreaded portion 21 of shank next to head—0.195; length of unthreaded portion 21 next to head—0.150. However, the dimensions can be varied, as desired.

It will be appreciated that the specific drive relationship shown between the key and the bolt can also be used between the key and other types of fasteners, such as nuts having blind bores. Accordingly, certain claims are directed to the broad key-fastener combination. It also will be appreciated that while the tamper-proof bolt of the present invention has been described relative to a gas meter, it has numerous other applications where tamper-proof fastening is required.

It can thus be seen that the improved tamper-proof bolt and key arrangement of the present invention are manifestly capable of achieving the above-enumerated objects and while preferred embodiments of the present invention have been disclosed, it will be appreciated that it is not limited thereto but may be otherwise embodied within the scope of the following claims.

What is claimed is:

1. A tamper-proof bolt comprising a shank, a threaded end on said shank, a frustoconical head on said shank, a face on said head, an undulating curvilinear groove in said face, an inner side of said groove, an island within said groove, an outer side of said island, a plurality of lobes and portions between said lobes defining said outer side of said island and comprising said inner side of said groove, an outer side of said groove, a cylindrical boss coaxial with said shank and extending in the same direction as said island, said cylindrical boss having a first radius and said portions of said island between said lobes having a second radius which is substantially equal to said first radius.

2. A tamper-proof bolt as set forth in claim 1 wherein said cylindrical boss extends outwardly from said face.

3. A tamper-proof bolt comprising a shank having first and second ends, a threaded portion on said shank proximate said first end and extending toward said second end, a head formed intergrally with said shank and located at said second end, an enlarged unthreaded portion on said shank proximate said head having a diameter which is larger than the diameter of said threaded portion, said head being of frustoconical outer configuration having a larger base and a smaller base with said larger base being located proximate said enlarged unthreaded portion and said smaller base being on the opposite side of said larger base from said enlarged unthreaded portion, an undulating curvilinear groove in said smaller base for receiving a key, an island within said undulating curvilinear groove, said island having a central portion, said island including a plurality of lobes and portions between said lobes which define an inner side of said undulating curvilinear groove, said undulating curvilinear groove including a first side facing said island, said lobes having second sides facing said first side, a boss forming the central portion of said island and having a third side facing said first side and being located axially outwardly of said lobes, said boss being cylindrical and having a first radius, and said portions between said lobes having a second radius which is substantially equal to said first radius.

4. In a construction wherein a plate is mounted on a base having a threaded bore of a first diameter, and wherein said plate has a plate bore therein aligned with said threaded bore with said plate bore having a second diameter which is larger than said first diameter, a tamper-proof bolt comprising a shank having first and second ends, a threaded portion on said shank proximate said first end and extending toward said second end and having a third diameter of a size to fit into said threaded bore, a head formed intergrally with said shank and located at said second end, an enlarged unthreaded portion on said shank proximate said head, said enlarged unthreaded portion having a fourth diameter which is slightly larger than said second diameter to provide an interference fit with said plate bore, said head being of frustoconical outer configuration having a larger base and a smaller base with said larger base being located proximate said enlarged unthreaded portion of said shank and said smaller base being on the opposite side of said larger base from said enlarged unthreaded portion of said shank, an undulating curvilinear groove on said smaller base for receiving a key, an island within said undulating curvilinear groove, said island having a central portion, said island including a plurality of lobes and portions between said lobes which define an inner side of said undulating curvilinear groove, said undulating curvilinear groove including a first side facing said island, said lobes having second sides facing said first side, a boss forming the central portion of said island and having a third side facing said first side and being located axially outwardly of said lobes, said boss being cylindrical and having a first radius, and said portions between said lobes having a second radius which is substantially equal to said first radius.

5. A head construction for a tamper-proof member comprising a head, a face on said head, an undulating curvilinear groove in said face, an inner side on said groove, an island within said groove, an outer side on said island, a plurality of lobes with portions therebetween defining said outer side of said island and comprising said inner side of said groove, an outer side on said groove, a cylindrical boss coaxial with said head, said boss having a first radius and extending axially in the same direction as said island, and said portions of said island between said lobes having a second radius which is substantially equal to said first radius.

6. A tamper-proof bolt as set forth in claim 5 wherein said cylindrical boss extends outwardly from said face.

7. A self-aligning fastener and key construction comprising: a head on said fastener, a face on said head, an undulating curvilinear groove in said face, an island within said groove, an outer side in said groove facing said island, a plurality of lobes with portions therebetween on said island defining an inner side of said undulating curvilinear groove, a boss of cylindrical configuration on said island extending axially outwardly of said lobes and having a first radial dimension, a side on said boss, said portions of said inner side and portions of said side on said boss being in axial alignment with each other, said portions of said island between said lobes having a second radial dimension which is substantially equal to said first radial dimension; and a key having an undulating curvilinear ridge thereon of complementary mating shape to said undulating curvilinear groove, and an inner side on said ridge for engaging said lobes, said inner side of said ridge including spaced innermost portions of which lie on a circle having a third radial dimension which is only slightly larger than said first radial dimension so that said spaced innermost portions of said ridge center said key relative to said head and permit said key to rotate relative to said head by riding on said side of said boss until said undulating curvilinear ridge is aligned with said undulating curvilinear groove and moves axially into driving relationship therewith.

* * * * *